(12) United States Patent
Seki et al.

(10) Patent No.: US 7,662,446 B2
(45) Date of Patent: Feb. 16, 2010

(54) POLARIZING PLATE

(75) Inventors: Kaori Seki, Kanuma (JP); Tadashi Akamatsu, Kanuma (JP); Zemin Shi, Kanuma (JP); Hiroyuki Torisu, Kanuma (JP)

(73) Assignees: Sony Corporation, Tokyo (JP); Sony Chemical & Information Device Corporation, Tokyo (JP)

( * ) Notice: Subject to any disclaimer, the term of this patent is extended or adjusted under 35 U.S.C. 154(b) by 0 days.

(21) Appl. No.: 10/497,487

(22) PCT Filed: Dec. 24, 2002

(86) PCT No.: PCT/JP02/13431

§ 371 (c)(1),
(2), (4) Date: Jun. 3, 2004

(87) PCT Pub. No.: WO03/054593

PCT Pub. Date: Jul. 3, 2003

(65) Prior Publication Data

US 2005/0057706 A1    Mar. 17, 2005

(30) Foreign Application Priority Data

Dec. 21, 2001  (JP) .............. 2001-389355
Aug. 12, 2002  (JP) .............. 2002-234421

(51) Int. Cl.
*G02F 1/1335*    (2006.01)

(52) U.S. Cl. .............. 428/1.33; 428/1.54; 34/96; 34/122

(58) Field of Classification Search ........... 428/1.31, 428/1.5, 1.53–1.54, 1.33; 427/160, 163.1; 349/96, 122, FOR. 119; 359/352, 491, 507, 359/511, 513
See application file for complete search history.

(56) References Cited

U.S. PATENT DOCUMENTS 4,061,418 A * 12/1977 Poensgen .............. 349/96

(Continued)

FOREIGN PATENT DOCUMENTS

JP     A 7-174919     7/1995

(Continued)

OTHER PUBLICATIONS

Comparative Toxicogenomics Database, Mount Desert Island Biological Laboratory, Chemicals: neopentylglycol diacrylate.[online], [retrieved on Mar. 16, 2007]. Retrieved from the Internet <URL: http://ctd.mdibl.org/detail.go;jsessionid=B4DF08A20893DFCE F19B3757F5A863E5?type=chem&acc=C044476>.*

(Continued)

*Primary Examiner*—David R Sample
*Assistant Examiner*—Sophie Hon
(74) *Attorney, Agent, or Firm*—Oliff & Berridge, PLC (57)     ABSTRACT

A polarizing plate has a polarizer and a protective film formed on at least one surface of the polarizer. The protective film is formed by curing an energy ray-curable composition that contains at least one of a first energy ray-polymerizing compound having a bisphenol residue, a second energy ray-polymerizing compound having a neopentylglycol group, a third energy ray-polymerizing compound having a trimethylolpropane group, and a fourth energy ray-polymerizing compound having a pentaerythritol group. In the polarizing plate, though the protective film is thin, the polarizer is protected from the influence of external moisture, etc., and therefore its polarizability is kept good even in high-temperature high-humidity environments.

15 Claims, 1 Drawing Sheet

U.S. PATENT DOCUMENTS

| | | | |
|---|---|---|---|
| 4,166,871 A * | 9/1979 | Schuler | 427/163.1 |
| 4,180,487 A * | 12/1979 | Floyd | 528/123 |
| 4,261,656 A * | 4/1981 | Wu | 351/163 |
| 4,803,014 A * | 2/1989 | Okumura et al. | 252/585 |
| 4,832,748 A * | 5/1989 | Tawara et al. | 523/454 |
| 5,104,929 A * | 4/1992 | Bilkadi | 524/847 |
| 5,231,524 A * | 7/1993 | De Keyzer et al. | 349/122 |
| 5,478,869 A * | 12/1995 | Takahashi et al. | 522/77 |
| 5,516,456 A * | 5/1996 | Shinohara et al. | 252/299.01 |
| 5,573,831 A * | 11/1996 | Suzuki et al. | 428/64.1 |
| 5,618,868 A * | 4/1997 | Misawa et al. | 524/159 |
| 5,998,013 A * | 12/1999 | Shoshi et al. | 428/331 |
| 6,055,096 A * | 4/2000 | Michihata et al. | 359/352 |
| 6,164,785 A * | 12/2000 | Maekawa | 359/613 |
| 6,259,499 B1 * | 7/2001 | Yamanashi | 349/113 |
| 6,395,365 B1 * | 5/2002 | Hayashi | 428/64.1 |
| 6,592,950 B1 * | 7/2003 | Toshima et al. | 428/1.1 |
| 6,613,426 B2 * | 9/2003 | Onozawa et al. | 428/323 |
| 7,209,196 B2 * | 4/2007 | Saiki et al. | 349/96 |
| 2001/0030720 A1 | 10/2001 | Ichihashi | 349/156 |
| 2003/0001987 A1 * | 1/2003 | Trapani et al. | 349/96 |

FOREIGN PATENT DOCUMENTS

| | | |
|---|---|---|
| JP | A-07174919 | 7/1995 |
| JP | A-2000-310713 | 11/2000 |
| JP | A 2000-310713 | 11/2000 |
| JP | A-2001-147320 | 5/2001 |
| JP | A 2001-242315 | 9/2001 |

OTHER PUBLICATIONS

JPO Website Machine English Translation of JP 07-174919, Akihiko et al., Jul. 14, 1995.*

* cited by examiner

FIG. 1

POLARIZING PLATE

This application is a 371 of PCT/JP02/13431 filed Dec. 24, 2002.

TECHNICAL FIELD

The present invention relates to a polarizing plate.

BACKGROUND ART

Heretofore, polarizing plates are used in optical devices such as liquid-crystal display devices, organic EL display devices, glasses and others, and the polarizing plates for such applications are generally constructed by sticking, with an adhesive, protective films on both surfaces of a polarizer formed of an iodine-colored, uniaxial-oriented polyvinyl alcohol resin film, for improving the strength, the water resistance and the moisture resistance of the polarizer.

For the protective film for such polarizing plates, used is an acetyl cellulose resin film (TAC film) of good optical transparency; and a hydrophilic adhesive is used for them, taking the matter into consideration that both the polarizer and the protective film are hydrophilic.

In the above-mentioned polarizer, the coloring polyiodide ions (e.g., $I_3^-$, $I_5^-$) exhibits the polarizability thereof as a result of the uniaxial orientation of the polyvinyl alcohol resin film. Therefore, when the polarizer receives moisture (water vapor), then the polyiodide therein decomposes into iodide ions ($I^-$) and the coloration by the polyiodide ions is thereby reduced. This phenomenon is more remarkable in high-temperature environments. As a result, it is considered that the transmittance of the polarizer may increase and the polarizer may lose its polarizability. Accordingly, protective films for polarizing plates are required to have the ability to protect polarizers from the influence of external moisture and others thereon.

However, taking the matter into consideration that both the TAC film and the adhesive in conventional polarizing plates are hydrophilic, the thickness of the TAC film has heretofore made to be at least about 80 μm in order that the film may protect polarizers from the influence of external moisture thereon. Accordingly, conventional polarizing plates are problematic in that they could not satisfy the requirement in the recent art of optical display devices that the protective films for polarizing plates for such devices are thinned as much as possible (for example, their thickness is reduced to at most 40 μm).

DISCLOSURE OF THE INVENTION

The present invention is to solve the above-mentioned problems with the related art, and its object is to make it possible to protect polarizers from the influence of external moisture and others thereon even when the protective films for them in polarizing plates are thinned.

The present inventors have found that, when a protective film formed of a curable composition that contains an energy ray-polymerizing compound having a specific substituent is provided on at least one surface of a polarizer, then it can attain the above-mentioned object, and have completed the present invention.

Specifically, the present invention provides a polarizing plate having a polarizer and a protective film formed on at least one surface of the polarizer, wherein the protective film is formed by curing an energy ray-curable composition that contains at least one of a first energy ray-polymerizing compound having a bisphenol residue, a second energy ray-polymerizing compound having a neopentylglycol group, a third energy ray-polymerizing compound having a trimethylolpropane group, and a fourth energy ray-polymerizing compound having a pentaerythritol group.

The present invention also provides a liquid-crystal display device having a liquid-crystal panel and the above-mentioned polarizing plate provided on at least one surface of the liquid-crystal panel.

BEST MODE FOR CARRYING OUT THE INVENTION

The present invention is described in detail hereinunder.

The polarizing plate of the present invention is constructed by forming a protective film on at least one surface of a polarizer. The protective film is formed by irradiating an energy ray-curable composition that contains at least one of first to fourth energy ray-polymerizing compounds, especially an energy ray-curable composition that contains both a first energy ray-polymerizing compound and a second energy ray, with energy rays such as UV rays or electron rays to thereby polymerize and cure the energy ray-polymerizing compounds in the composition.

Accordingly, even when the thickness of the protective film in the polarizing plate of the present invention is reduced to at most about 40 μm, the film is still effective for protecting the polarizer therein from the influences of external moisture and others. In addition, the protective film may function also as a support for the polarizer.

Preferably, the energy ray-curable composition to form the protective film is so designed that, when it contains a first energy ray-polymerizing compound, then the content of the compound is at least 20% by weight in terms of the resin solid content thereof; when it contains a second energy ray-polymerizing compound, then the content of the compound is at least 40% by weight in terms of the resin solid content thereof; and when it contains a third energy ray-polymerizing compound, then the content of the compound is at least 60% by weight in terms of the resin-solid content thereof. If the content of these energy ray-polymerizing compounds is too low, then it will be difficult to maintain the polarizability of the polarizer.

The bisphenol group in the first energy ray-polymerizing compound is represented by the following general formula (1):

where in formula (1), R represents a hydrogen atom or a methyl group.

The bisphenol group includes, for example, a bisphenol A-type group of the following general formula (2), and a bisphenol F-type group of the following general formula (3):

(2)

(3)

The neopentylglycol group in the second energy ray-polymerizing compound is represented by the following general formula (4):

(4)

The trimethylolpropane group in the third energy ray-polymerizing compound is represented by the following general formula (5):

(5)

The pentaerythritol group in the fourth energy ray-polymerizing compound is represented by the following general formula (6):

(6)

The main part that contributes to the polymerization of the first to fourth energy ray-polymerizing compounds is, for example, a (meth)acryloyl residue that contains an acryloyl or methacryloyl group as a part thereof. The (meth)acryloyl residue ($CH_2$=CRCO—, in which R represents a hydrogen atom or a methyl group) may bond to the neopentylglycol, pentaerythritol, trimethylolpropane or bisphenol group, via an oxygen atom (—O—) (that is, as a (meth)acryloyloxy group), or via an oxyalkyleneoxy group (—O($CH_2$)$_n$O—, —O($CH_2$)$_m$O—, in which n and m each indicate an integer of from 1 to 10) therebetween.

The residue may also bond to the group via an EO (ethylene oxide)-modified residue, a PO (propylene oxide)-modified residue, an epoxy-modified residue or a modified residue of their combination. For example, the (meth)acryloyl residue may bond to the bisphenol group via —O($CH_2CH_2$O)$_n$—, —O(CH($CH_3$)$CH_2$O)$_n$—, —O($CH_2CH_2$O)$_m$—, or —O(CH($CH_3$)$CH_2$O)$_m$—. In these, n and m each indicate an integer of from 1 to 10.

Preferred examples of the first energy ray-polymerizing compound are compounds of the following chemical formulae (a) and (b). Chemical formula (a) indicates a first energy ray-polymerizing compound having a bisphenol A group; and chemical formula (b) indicates a first energy ray-polymerizing compound having a bisphenol F group.

(a)

(b)

In formulae (a) and (b), R represents a hydrogen atom or a methyl group; X represents —O—, —O($CH_2CH_2$O)$_n$— or —O(CH($CH_3$)$CH_2$O)$_n$—; Y represents —O—, —O($CH_2CH_2$O)$_m$— or —O(CH($CH_3$)$CH_2$O)$_m$—; n and m each indicate an integer of from 1 to 10.

Specific examples of the first energy ray-polymerizing compound are EO-modified bisphenol A diacrylate (SR-349 by Sartomer; R-551 by Nippon Kayaku), EO-modified bisphenol F diacrylate (R-712 by Nippon Kayaku), epoxy-modified bisphenol A dimethacrylate (Epoxy Ester 3002M by Kyoei Chemical), epoxy-modified bisphenol A acrylate (Epoxy Ester 3002A by Kyoei Chemical), diglycidyl ether-modified bisphenol A dimethacrylate (Epoxy Ester 3000M by Kyoei Chemical), diglycidyl ether-modified bisphenol A diacrylate (Epoxy Ester 3000A by Kyoei Chemical).

Preferred examples of the second energy ray-polymerizing compound are compounds of the following chemical formulae (c) to (e).

(c)

(d)

(e)

Preferred examples of the third energy ray-polymerizing compound are compounds of the following chemical formulae (f) and (g).

(f)

(g)

Preferred examples of the fourth energy ray-polymerizing compound are compounds of the following chemical formulae (h) and (i).

(h)

(i)

The energy ray-curable composition to form the protective film in the present invention may contain, if desired, at least one or more energy ray-polymerizing compounds selected from the first, third and fourth energy ray-polymerizing compounds and optionally a fifth energy ray-polymerizing compound mentioned below, in addition to the second energy ray-polymerizing compound in the composition.

Specific examples of the fifth energy ray-polymerizing compound include ethylenic unsaturated monomers. Concretely, they include methyl(meth)acrylate, ethyl(meth)acrylate, propyl(meth)acrylate, n-butyl (meth)acrylate, t-butyl (meth)acrylate, 2-ethylhexyl (meth)acrylate, n-nonyl(meth)acrylate, cyclohexyl (meth)acrylate, benzyl(meth)acrylate, dicyclopentenyl (meth)acrylate, 2-dicyclopentenoxy(meth)acrylate, methoxyethyl(meth)acrylate, ethoxyethyl(meth)acrylate, butoxyethyl(meth)acrylate, methoxyethoxyethyl (meth)acrylate, ethoxyethoxyethyl(meth)acrylate, tetrahydrofurfuryl(meth)acrylate, carbitol acrylate, benzyl acrylate, allyl acrylate, phenoxyethyl acrylate, styrene, vinyltoluene, chlorostyrene, α-methylstyrene, acrylonitrile, vinyl acetate, N-vinylpyrrolidone, acryloxyethyl phosphate, 2-vinylpyridine, 2-ethylhexyl acrylate, 2-hydroxyethyl(meth)acrylate, 2-hydroxypropyl acrylate, ethylcarbitol acrylate, polypropylene glycol diacrylate, polyethylene glycol (#200, #400, #600) diacrylate, 2-hydroxy-3-phenoxypropyl acrylate, 2-acryloyloxyethylsuccinic acid, 1,6-hexanediol diacrylate, trimethylolpropane triacrylate, EO (ethylene oxide)-modified trimethylolpropane triacrylate, methyltriglycol, acryloylmorpholine, 1,9-nonanediol diacrylate, 2-n-butyl-2-ethyl-1,3-propanediol diacrylate. Their oligomers are also usable herein. In addition, polyester (meth)acrylates, urethane (meth)acrylates, polybutadiene (meth)acrylates, isoprene acrylates and epoxyacrylates are also usable herein. In particular, polyester (meth)acrylates such as acrylates of aliphatic polyesters (e.g., polyester of adipic acid with ethylene glycol) are preferably used in the composition.

When the fifth energy ray-polymerizing compound is used in the energy ray-curable composition, its amount may be at most 95% by weight, preferably at most 80% by weight of the composition, though depending on the type of the compound. If the amount of the compound oversteps the range, the content of the other energy ray-polymerizing compounds may be reduced relatively to it and, if so, the effect of the present invention could not be attained.

In the polarizing plate of the present invention, also usable is the energy ray-curable composition that contains the third energy ray-polymerizing compound, and at least one of the first, second, fourth and fifth energy ray-polymerizing compounds added thereto.

Also usable is the energy ray-curable composition that contains the fourth energy ray-polymerizing compound, and at least one of the first to third and fifth energy ray-polymerizing compounds added thereto.

Still usable is the energy ray-curable composition that contains a mixture of the first and second energy ray-polymerizing compounds, and at least one of the third to fifth energy ray-polymerizing compounds added thereto.

In order that the energy ray-curable composition polymerizes and cures, it is desirable that any of the energy ray-polymerizing compounds in the composition is a polyfunctional compound, for example, containing 2 or more (meth)acryloyl residues in one molecule. If desired, the composition may contain a known crosslinking agent such as a polyisocyanate-type crosslinking agent.

The energy ray-curable composition may contain an energy ray polymerization initiator. The energy ray polymerization initiator may be suitably selected, for example, from cobalt octenoate, cobalt naphthenate, manganese octenoate, manganese naphthenate, methyl ethyl ketone peroxide, cyclohexanone peroxide, cumene hydroperoxide, benzoyl peroxide, dicumyl peroxide, t-butyl perbenzoate, benzoin, benzoin methyl ether, benzoin ethyl ether, benzoin isopropyl ether, benzoin n-butyl ether, benzoin phenyl ether, anthraquinone, naphthoquinone, pivaloin ethyl ether, benzyl ketal, 1,1-dichloroacetophenone, p-t-butyldichloroacetophenone-, 2-chlorothioxanthone, 2,2-diethoxyacetophenone, Michler's ketone, 2,2-dichloro-4-phenoxyacetophenone, 2,2-dimethoxy-2-phenylacetophenone, benzophenone, 2-methylthioxanthone, phenyl glyoxylate, α-hydroxyisobutylphenone, dibenzosuberone, benzophenone-amines (e.g., N-methyldiethanol, triethylamine), benzyldiphenyl disulfide, tetramethylthiuram monosulfite, azobisisobutyronitrile, dibenzyl, diacetyl, acetophenone, 2,2-dimethoxy-2-phenylacetophenone, 2-methyl-[4-(methylthio)phenyl]-2-morpholino-1-propanone, 1-hydroxycyclohexyl phenyl ketone, 2-hydroxy-2-methyl-1-phenylpropan-1-one-methyl benzoylformate, depending on the type of the energy ray used for the composition.

The amount of the energy ray polymerization initiator to be in the composition is not specifically defined, but is preferably from 0.1 to 15 parts by weight, more preferably from 0.5 to 10 parts by weight relative to 100 parts by weight, in terms of the resin solid content thereof, of the total weight of the energy ray-polymerizing compounds in the composition.

If desired, the energy ray-curable composition in the present invention may contain an organic solvent. The organic solvent includes ketone solvents such as acetone, methyl ethyl ketone, cyclohexanone; ester solvents such as methyl acetate, ethyl acetate, butyl acetate, ethyl lactate, methoxyethyl acetate, propylene glycol monomethyl ether acetate, ethylene glycol diacetate; ether solvents such as diethyl ether, ethylene glycol dimethyl ether, dioxane; aromatic solvents such as toluene, xylene; aliphatic solvents such as pentane, hexane; halogen-containing solvents such as methylene chloride, chlorobenzene, chloroform; and alcohol solvents such as isopropyl alcohol, butanol.

Further if desired, the energy ray-curable composition may contain additives such as a pigment, a filler, a leveling agent, a defoaming agent, a thermoplastic resin, etc.

In the present invention, the protective film may be formed by applying the above-mentioned, energy ray-curable composition to at least one surface of a polarizer that will be described hereinunder, according to a known coating method such as a curtain-coating method, roll-coating method, flow-coating method, spray-coating method or dip-coating method, then optionally heating it at 40 to 100° C. to vaporize and remove the organic solvent, and curing it through irradiation with energy rays, for example, electromagnetic waves such as far-UV rays, UV rays, near-UV rays, X-rays, γ rays, or electron rays, proton rays or neutron rays.

Above all, UV rays are preferred for the energy rays in view of the film-forming speed (curing speed of the composition) trough irradiation with them-, the easy availability of the energy ray-irradiation device, and the cost for the irradiation with them.

UV rays as referred to herein are those mainly falling within a wavelength range of from 150 to 450 nm, and they may be generated by chemical lamps, high-pressure mercury lamps, metal halide lamps, xenon lamps, etc.

The thickness of the protective film is not specifically defined, but is preferably at most 40 μm, more preferably at most 25 μm from the viewpoint of reducing the thickness of the film.

Not only directly formed on a polarizer, the protective film may also be formed by applying the curable composition onto a releasable sheet, followed by irradiating it with energy rays to form a film, and the thus-formed protective film may be stuck to a polarizer with a known adhesive or paste.

The polarizer of the polarizing plate of the present invention is not specifically defined, and may be any known one. Especially preferred for it is an iodine-colored, uniaxial-oriented film of polyvinyl alcohol resin.

Polyvinyl alcohol resin is generally produced by saponifying a polyvinyl acetate prepared through polymerization of vinyl acetate. Not limited to it, however, the resin for use in the present invention may contain a small amount of a component copolymerizable with vinyl acetate, such as that selected from unsaturated carboxylic acids (including their salts, esters, amides, nitriles, etc.), olefins, vinyl ethers, unsaturated sulfonic acid salts and others. The mean degree of saponification of the polyvinyl alcohol resin is preferably from 85 to 100 mol %, more preferably from 98 to 100 mol % for practical use of the resin. The mean degree of polymerization of the polyvinyl alcohol resin may be any desired one.

Any known method is employable for producing the polarizer. Some concrete methods for producing it are mentioned below. A polyvinyl alcohol resin is dissolved in water or an organic solvent (e.g., dimethylsulfoxide (DMSO), polyalcohol such as glycerin, amine such as ethylenediamine) or a mixed solvent thereof with an organic solvent (having a water content of approximately from 5 to 30% by weight) to prepare a resin solution having a resin content of approximately from 5 to 20% by weight, then it is formed into a film, and (a) the film is stretched, and then colored by dipping it in an iodine solution or a dichroic dye solution, and thereafter it is processed with a boron compound;

(b) the film is stretched and colored at the same time while it is dipped in an iodine solution or a dichroic dye solution, and then it is processed with a boron compound;

(c) the film is colored by dipping it in an iodine solution or a dichroic dye solution, and then stretched, and thereafter it is processed with a boron compound; or (d) the film is colored by dipping it in an iodine solution or a dichroic dye solution, and then stretched in a boron compound solution.

Polyvinyl alcohol resin may be formed into films in any known method of casting, extrusion, gel film formation or the like.

It is desirable that the film of polyvinyl alcohol resin is uniaxially stretched preferably at a temperature falling between 40 and 170° C. once or repeatedly by 3 to 10 times, preferably by 3.5 to 6 times. In this stage, the film may also be stretched in some degree in the direction perpendicular to the previous uniaxial direction (in such a degree that it could prevent the shrinkage in the cross direction or more).

The film of polyvinyl alcohol resin may be colored by contacting it with an iodine solution or with a dichroic dye-containing solution. Generally used is an aqueous solution of iodine-potassium iodide, in which it is suitable that the iodine concentration is from 0.1 to 2 g/liter, the potassium iodide concentration is from 10 to 50 g/liter and the ratio by weight of iodine/potassium iodide falls between 20 and 100. Practically, the time for coloration may fall between 30 and 500 seconds or so. Preferably, the temperature of the coloration bath falls between 5 and 50° C. Except water, the bath may contain a small amount of an organic solvent miscible with water. For the contact, employable is any desired means of dipping, coating, spraying or the like.

The colored polyvinyl alcohol resin film is processed with a boron compound. For example, the polyvinyl alcohol resin film is dipped in an aqueous solution of a boron compound such as boric acid or borax or in an aqueous organic solvent solution thereof (0.5 to 2 mol/liter or so), in the presence of a small amount of potassium iodide at a temperature falling between 50 and 70° C., or coating the film with the solution, or spraying the film with the solution. If desired, the film may be stretched while it is processed with a boron compound.

The polarizing plate of the present invention may be produced by forming a protective film on at least one surface of a polarizer, as so mentioned hereinabove.

A conventional TAC film may be stuck to one or both surfaces of the polarizing plate of the present invention with an adhesive, not detracting from the effect of the present invention, and if desired, a known transparent pressure-sensitive adhesive layer may be provided thereon in an ordinary method.

Especially preferably, the pressure-sensitive adhesive layer comprises, as the essential ingredient thereof, a copolymer of an acrylate such as butyl acrylate, ethyl acrylate, methyl acrylate or 2-ethylhexyl acrylate, with an α-monoolefin-carboxylic acid such as acrylic acid, maleic acid, itaconic acid, methacrylic acid or crotonic acid (optionally with a vinyl monomer such as acrylonitrile, vinyl acetate or styrol), as not interfering with the polarizing property of the polarizer.

In addition, transparent paste such as polyvinyl ether-type or rubber-type paste may also be used.

If desired, the polarizing plate of the present invention may be laminated with one or more functional layers such as antiglare layer, hard-coat layer, antireflection layer, half-reflection layer, reflection layer, luminous layer, light-diffusive layer, electroluminescent layer and others, via a adhesive or paste.

The polarizing plate of the present invention is favorably applied to at least one surface of display panels such as liquid-crystal panels or organic EL panels having a conventional known structure, or to at least one surface of lenses for glasses such as sunglasses or glasses for eyesight correction.

Figure 1:
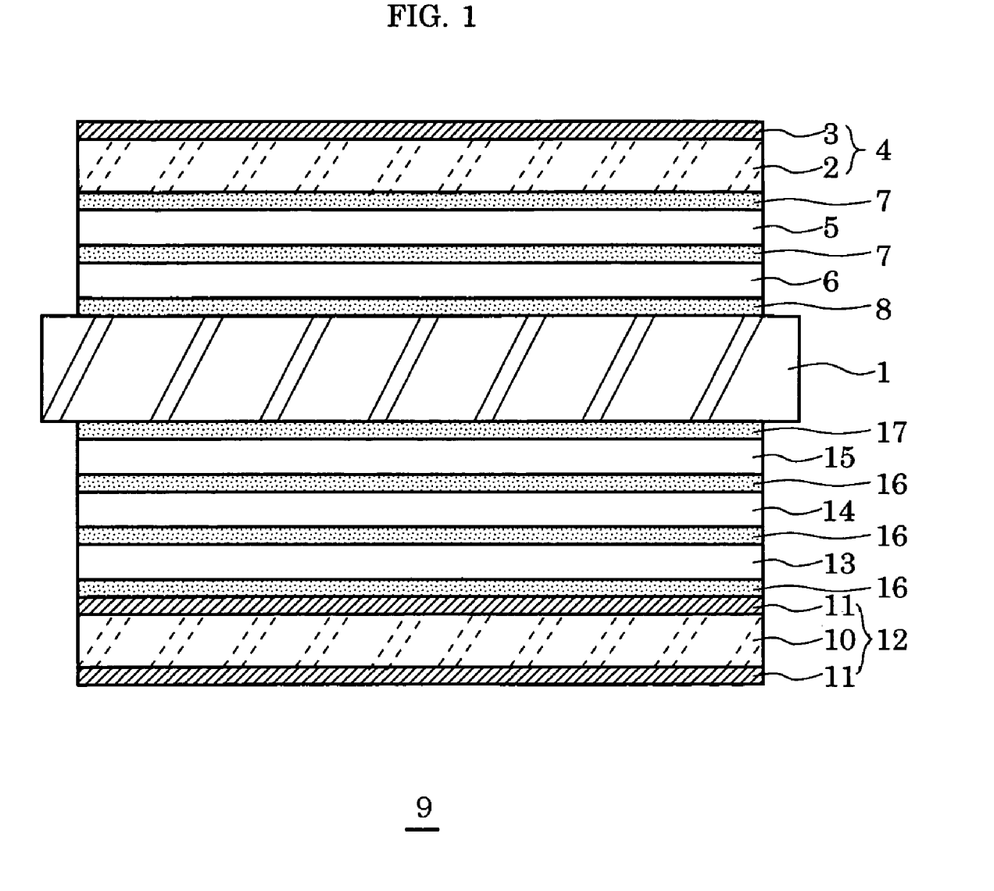
FIG. 1 is a schematic cross-sectional view of a liquid-crystal display device with polarizing plates of the prensent invention.

For example, as in FIG. 1, a polarizing plate 4 formed of a polarizer 2 and a protective film 3 is laminated with a λ/2 retardation film 5 and a 4/λ retardation film 6 each via an adhesive layer 7 on the side opposite to the protective film 3, and the entire laminate is stuck to one surface of a liquid-crystal panel 1 via an adhesive layer 8; while, on the other hand, a polarizing plate 12 is formed of a polarizer 10 coated a protective film 11 on both surfaces thereof, the polarizing plate 12 is laminated with a λ/2 retardation film 13, a 4/λ retardation film 14 and a viewing angle improver film 15 each via an adhesive layer 16 on one surface thereof, and the entire laminate is stuck to the other surface of the liquid panel 1 via an adhesive layer 17. Thus constructed, the liquid-crystal display device 9 has thin polarizing plates.

EXAMPLES

The present invention is described concretely with reference to Examples.

Examples 1a to 1d, and Comparative Examples 1a and 1b

A polyvinyl alcohol film having a degree of saponification of 99.5 mol % (75 μm thick) was well swollen by dipping it in pure water, and then colored by dipping it in an iodine colorant solution (iodine/potassium iodide/boric acid/pure water=0.2 g/30 g/30 g/1 liter) at 35° C. for 4 minutes.

The thus-colored polyvinyl alcohol film was uniaxially stretched by at least 5 times in a stretching solution (potassium iodide/boric acid/pure water=30 g/30 g/1 liter).

The thus-stretched polyvinyl alcohol film was dipped in a fixation solution (potassium iodide/boric acid/pure water=40 g/40 g/1 liter) at 40° C. for 3 minutes so as to fix iodine in the film, and then the film was taken out of the solution and dried in a drying furnace (65° C., 5 minutes) to produce a polarizer.

Next, an energy ray-curable composition that had been formulated as in Table 1 was applied to both surfaces of the thus-produced polarizer to a thickness of 20 μm, and then irradiated with UV rays (wavelength, 365 nm) from a metal halide lamp to an overall quantity of light of 400 mJ/cm$^2$ whereby the composition was cured to form a protective film. The process gave a polarizing plate.

Thus obtained, the polarizing plate was subjected to an aging test by leaving it in an environment of 60° C. and 90% RH for 100 hours. Before and after the aging test, the mean transmittance of the plate was measured with a spectrophotometer within a wavelength range of from 400 to 700 nm. When the transmittance increment before and after the aging test is smaller than 10%, then the sample is judged good; but when it is 10% or more, then the sample is judged not good. The results obtained are shown in Table 1.

TABLE 1

| | | Example 1 | | | | Comparative Example 1 | |
|---|---|---|---|---|---|---|---|
| Component | | a | b | c | d | a | b |
| EO-modified bisphenol A diacrylate*1 | | 100 | 60 | 40 | 20 | — | — |
| Aliphatic polyester acrylate*2 | | — | 40 | 60 | 80 | 100 | — |
| 2-Ethylhexyl acrylate*3 | | — | — | — | — | — | 100 |
| 2-Hydroxy-2-methyl-1-phenylpropan-1-one*4 | | 5 | 5 | 5 | 5 | 5 | 5 |
| Transmittance (%) | before aging | 41.5 | 40.5 | 40.5 | 41.0 | 41.0 | 42.8 |
| | after aging | 42.9 | 42.5 | 42.5 | 43.8 | 85.2 | 80.0 |
| | rate of change (%) | 3.35 | 4.83 | 4.77 | 6.92 | 108 | 86.7 |
| | Judgment | good | good | good | good | not good | not good |

Notes:
*1SR-349 by Sartomer
*2M-6200 by Toa Gosei
*32EHA by Nippon Shokubai
*4D1173 (polymerization initiator) by Chiba specialty chemicals From the results in Table 1, it is understood that, in the polarizing plates of Examples 1a to 1d that have a protective film formed of an energy ray (UV ray)-curable composition containing at least 20% by weight of a bisphenol residue-having first energy ray-polymerizing compound, the polyiodide was protected from discoloration though the protective film had a thickness of 20 μm and was extremely thin, and the polarizer was protected from external influences such as moisture, etc.

On the other hand, in the polarizing plates of Comparative Examples 1a and 1b in which the protective film was formed of a different polymerizing compound, polyester acrylate or 2-ethylhexyl acrylate, the polyiodide discolored and therefore the transmittance of the plates increased, and it is understood that the polarizing plates of these comparative examples are not practicable.

Examples 2a to 2d, Comparative Examples 2a and 2b

A polyvinyl alcohol film having a degree of saponification of 99.5 mol % (75 μm thick) was well swollen by dipping it in pure water, and then colored by dipping it in an iodine colorant solution (iodine/potassium iodide/boric acid/pure water=0.2 g/30 g/30 g/1 liter) at 35° C. for 4 minutes.

The thus-colored polyvinyl alcohol film was uniaxially stretched by at least 5 times in a stretching solution (potassium iodide/boric acid/pure water=30 g/30 g/1 liter).

The thus-stretched polyvinyl alcohol film was dipped in a fixation solution (potassium iodide/boric acid/pure water=40 g/40 g/1 liter) at 40° C. for 3 minutes so as to fix iodine in the film, and then the film was taken out of the solution and dried in a drying furnace (65° C., 5 minutes) to produce a polarizer.

Next, an energy ray-curable composition that had been formulated as in Table 2 was applied to both surfaces of the thus-produced polarizer to a thickness of 20 μm, and then irradiated with UV rays (wavelength, 365 nm) from a metal halide lamp to an overall quantity of light of 400 mJ/cm$^2$ whereby the composition was cured to form a protective film. The process gave a polarizing plate.

Thus obtained, the polarizing plate was subjected to an aging test by leaving it in an atmosphere at 60° C. and 90% RH for 100 hours. Before and after the aging test, the mean transmittance of the plate was measured with a spectrophotometer within a wavelength range of from 400 to 700 nm. When the transmittance increment before and after the aging test is smaller than 10%, then the sample is judged good; but when it is 10% or more, then the sample is judged not good. The results obtained are shown in Table 2.

In Table 2, neopentyl glycol hydroxypivalate diacrylate is "MANDA", a trade name by Nippon Kayaku, and this is a type of the second energy ray-polymerizing compound. The polyester acrylate is "M-6200" a trade name by Toa Gosei, and this is a type of the fifth energy ray-polymerizing compound. The initiator is "D1173", a trade name by Chiba specialty chemicals; and the silane coupling agent is γ-acryloxypropyltriethoxysilane ("KBM-5103, a trade name by Shin-etsu Silicone).

From the results in Table 2, it is understood that, in the polarizing plates of Examples 2a to 2d in which the amount of the second energy ray-polymerizing compound was at least 40% by weight of the resin solid content of the composition (total of neopentyl glycol hydroxypivalate diacrylate and polyester acrylate), the polyiodide was protected from discoloration though the protective film had a thickness of 20 μm and was extremely thin, and the polarizer was protected from external influences such as moisture, etc.

On the other hand, in the polarizing plates of Comparative Examples 2a and 2b in which the amount of the second energy ray-polymerizing compound was smaller than 40% by weight of the resin solid content of the composition, the polyiodide discolored and therefore the transmittance of the plates increased after the aging test, and it is understood that the polarizing plates of these comparative examples are not practicable.

Examples 3a to 3c, Comparative Examples 3a to 3c

Polarizing plates of Examples 3a to 3c and Comparative Examples 3a to 3c were produced under the same condition as in Examples 2a to 2d, for which, however, energy ray-curable compositions as in Table 3 below were used in place of the energy ray-curable compositions for Examples 2a to 2d mentioned above. Also under the same condition as in Examples 2a to 2d, the transmittance of the plates was measured. The data and the evaluation results are shown in Table 3 below.

TABLE 2

| | | Example 2 | | | | Comparative Example 2 | |
|---|---|---|---|---|---|---|---|
| | | a | b | c | d | a | b |
| Composition | Neopentyl glycol hydroxypivalate diacrylate | 100 | 80 | 60 | 40 | 20 | 0 |
| | Polyester acrylate | 0 | 20 | 40 | 60 | 80 | 100 |
| | Polymerization initiator | 5 | 5 | 5 | 5 | 5 | 5 |
| | Silane coupling agent | 6 | 6 | 6 | 6 | 6 | 6 |
| Transmittance (%) | before aging | 39.40 | 41.00 | 40.30 | 40.70 | 40.50 | 40.20 |
| | after aging | 41.10 | 42.30 | 41.90 | 42.60 | 46.30 | 89.30 |
| | rate of change (%) | 4.29 | 3.12 | 1.05 | 4.67 | 14.40 | 121.97 |
| | Judgment | good | good | good | good | not good | not good |

TABLE 3

| | | Example 3 | | | Comparative Example 3 | | |
|---|---|---|---|---|---|---|---|
| | | a | b | c | a | b | c |
| Composition | EO-modified TMPTA | 100 | 80 | 60 | 40 | 20 | 0 |
| | Polyester acrylate | 0 | 20 | 40 | 60 | 80 | 100 |
| | Polymerization | 5 | 5 | 5 | 5 | 5 | 5 |

TABLE 3-continued

|  |  | Example 3 | | | Comparative Example 3 | | |
|---|---|---|---|---|---|---|---|
|  |  | a | b | c | a | b | c |
|  | initiator |  |  |  |  |  |  |
|  | Silane coupling agent | 6 | 6 | 6 | 6 | 6 | 6 |
| Transmittance | before aging | 41.40 | 40.70 | 39.70 | 39.60 | 41.40 | 40.20 |
| (%) | after aging | 42.80 | 42.80 | 42.50 | 53.50 | 67.50 | 89.30 |
|  | rate of change (%) | 3.50 | 5.21 | 7.10 | 35.10 | 63.13 | 121.97 |
|  | Judgment | good | good | good | not good | not good | not good |

In Table 3, EO-modified TMPTA (trimethylolpropane triacrylate) is "SR-454", a trade name by Sartomer, and this is a type of the third energy ray-polymerizing compound. The polyester acrylate, the polymerization initiator and the silane coupling agent are the same as those used in Examples 2a to 2d.

As is obvious from Table 3 above, it is understood that the rate of transmittance change of the polarizing plates of Examples 3a to 3c in which the amount of the third energy ray-polymerizing compound was at least 60% by weight of the resin solid content of the composition (total of EO-modified TMPTA and polyester acrylate) was smaller than that of the polarizing plates of Comparative Examples 3a to 3c, and though the protective film in the polarizing plates of these Examples 3a to 3c had a thickness of 20 μm and was extremely thin, the polyiodide in the plates was protected from discoloration and the polarizer of the plates was protected from external influences such as moisture, etc.

On the other hand, in the polarizing plates of Comparative Examples 3a to 3c in which the amount of the third energy ray-polymerizing compound was at most 40% by weight of the resin solid content of the composition, the polyiodide discolored and therefore the transmittance of the plates increased after the aging test, and it is understood that the polarizing plates of these comparative examples are not practicable.

Example 4a, Comparative Examples 4a to 4e

Polarizing plates of Example 4a and Comparative Examples 4a to 4e were produced under the same condition as in Examples 2a to 2d, for which, however, energy ray-curable compositions as in Table 4 below were used in place of the energy ray-curable compositions for Examples 2a to 2d mentioned above. Also under the same condition as in Examples 2a to 2d, the transmittance of the plates was measured. The data and the evaluation results are shown in Table 4 below.

TABLE 4

|  |  | Example | Comparative Example | | | | |
|---|---|---|---|---|---|---|---|
|  |  | 4a | 4a | 4b | 4c | 4d | 4e |
| Composition | Dipentaerythritol triacrylate | 100 | 80 | 60 | 40 | 20 | 0 |
|  | Polyester acrylate | 0 | 20 | 40 | 60 | 80 | 100 |
|  | Polymerization initiator | 5 | 5 | 5 | 5 | 5 | 5 |
|  | Silane coupling agent | 6 | 6 | 6 | 6 | 6 | 6 |
| Transmittance (%) | before aging | 40.80 | 40.50 | 40.70 | 41.10 | 40.30 | 40.20 |
|  | after aging | 44.00 | 49.30 | 58.00 | 73.00 | 81.00 | 89.30 |
|  | rate of change (%) | 7.92 | 21.87 | 42.42 | 77.67 | 101.04 | 121.97 |
|  | Judgment | good | not good | not good | not good | not good | not good |

In Table 4, dipentaerythritol triacrylate is "SR-454", a trade name by Sartomer, and this is a type of the fourth energy ray-polymerizing compound. The polyester acrylate, the polymerization initiator and the silane coupling agent are the same as those used in Examples 2a to 2d.

As is obvious from Table 4 above, it is understood that the rate of transmittance change of the polarizing plate of Example 4a in which the resin solid matter in the composition was the fourth energy ray-polymerizing compound alone was smaller than that of the polarizing plates of Comparative Examples 4a to 4e, and though the protective film in the polarizing plate of the Example had a thickness of 20 μm and was extremely thin, the polarizer of the plate was protected from external influences such as moisture, etc.

On the other hand, the rate of transmittance change of the polarizing plates of Comparative Examples 4a to 4e in which the amount of polyester acrylate, which is the fifth energy ray-polymerizing compound in the composition was 20% by weight or more of the resin solid content of the composition was extremely large as compared with that of the polarizing plate of Example 4a, and it is understood that the polarizing plates of these comparative examples are not practicable.

Example 5

A polarizing plate of Example 5 was produced under the same condition as in Examples 2a to 2d, for which, however, an energy ray-curable composition as in Table 5 below was used in place of the energy ray-curable compositions for Examples 2a to 2d mentioned above. Also under the same condition as in Examples 2a to 2d, the transmittance of the plate was measured. The data and the evaluation result are shown in Table 5 below.

TABLE 5

|  |  | Example 5 |
|---|---|---|
| Composition | EO-modified Bis-A acrylate | 50 |
|  | Neopentyl glycol hydroxypivalate diacrylate | 50 |
|  | Polymerization initiator | 5 |
|  | Silane coupling agent | 6 |
| Transmittance (%) | before aging | 42.70 |
|  | after aging | 43.90 |
|  | rate of change (%) | 2.98 |
|  | Judgment | good |

In Table 5, EO-modified Bis-A acrylate is "SR-349", a trade name by Sartomer, and this is a type of the first energy ray-polymerizing compound that has a bisphenol A-type group.

Neopentyl glycol hydroxypivalate diacrylate is "MANDA", a trade name by Nippon Kayaku, and this is a type of the second energy ray-polymerizing compound. The polymerization initiator and the silane coupling agent are the same as those used in Examples 2a to 2d.

As is obvious from Table 5 above, it is understood that the rate of transmittance change of the polarizing plate of Example 5 that contains both the first energy ray-polymerizing compound and the second energy ray-polymerizing compound was small enough for practical use, and though the protective film in the polarizing plate had a thickness of 20 μm and was extremely thin, the polarizer of the plate was protected from external influences such as moisture, etc.

Example 6

A polarizing plate of Example 6 was produced under the same condition as in Examples 2a to 2d, for which, however, an energy ray-curable composition as in Table 6 below was used in place of the energy ray-curable compositions for Examples 2a to 2d mentioned above. Also under the same condition as in Examples 2a to 2d, the transmittance of the plate was measured. The data and the evaluation result are shown in Table 6 below.

TABLE 6

|  |  | Example 6 |
|---|---|---|
| Composition | EO-modified Bis-F diacrylate | 50 |
|  | Neopentyl glycol hydroxypivalate diacrylate | 50 |
|  | Polymerization initiator | 5 |
|  | Silane coupling agent | 6 |
| Transmittance (%) | before aging | 42.45 |
|  | after aging | 43.62 |
|  | rate of change (%) | 2.76 |
|  | Judgment | good |

In Table 6, EO-modified Bis-F diacrylate is "R-712", a trade name by Nippon Kayaku, and this is a type of the first energy ray-polymerizing compound that has a bisphenol F-type group.

Neopentyl glycol hydroxypivalate diacrylate is "MANDA", a trade name by Nippon Kayaku, and this is a type of the second energy ray-polymerizing compound. The polymerization initiator and the silane coupling agent are the same as those used in Examples 2a to 2d.

As is obvious from Table 6 above, it is understood that the rate of transmittance change of the polarizing plate of Example 6 that contains both the bisphenol F-type group-having, first energy ray-polymerizing compound and the second energy ray-polymerizing compound was small enough for practical use, and though the protective film in the polarizing plate had a thickness of 20 μm and was extremely thin, the polarizer of the plate was protected from external influences such as moisture, etc.

INDUSTRIAL APPLICABILITY

In the polarizing plate of the present invention, though the protective film is thin, the polarizer is protected from the influence of external moisture and the like, and therefore its polarizability is kept good even in high-temperature high-humidity environments.

The invention claimed is:

1. A polarizing plate having a polarizer obtained from iodine-coloring a polyvinyl alcohol resin film, and a protective film directly formed on both surfaces of the polarizer, wherein the protective film has a thickness of 40 μm or less, and is formed by applying an energy ray-curable composition to the polarizer and irradiating the applied energy ray-curable composition with ultraviolet rays to polymerize and cure the energy ray-curable composition, wherein the energy ray-curable composition comprises an energy ray-polymerizing compound having a neopentylglycol group in an amount of at least 40% by weight in terms of a resin solid content thereof, selected from the group consisting of:

(c)

(d)

(e)

the polyvinyl alcohol is dyed only with iodine.

2. The polarizing plate according to claim 1, wherein the energy ray-curable composition contains the first energy ray-polymerizing compound having a bisphenol residue.

3. The polarizing plate according to claim 2, wherein the energy ray-curable composition comprises the energy ray-polymerizing compounds in an amount of 50% by weight in terms of the resin solid content thereof.

4. The polarizing plate according to claim 2, wherein the energy ray-polymerizing compound having a bisphenol residue has a bisphenol A-type group.

5. The polarizing plate according to claim 2, wherein the energy ray-polymerizing compound having a bisphenol group has a bisphenol F-type group.

6. The polarizing plate according to claim 1, wherein the energy ray-curable composition further comprises an energy ray-polymerizing compound that comprises a polyester (meth)acrylate.

7. A liquid-crystal display device having a liquid crystal panel, and the polarizing plate of any of claim 1 provided on at least one surface of the liquid-crystal panel.

8. A polarizing plate having a polarizer obtained form iodine-coloring a polyvinyl alcohol resin film, and a protective film directly formed on both surfaces of the polarizer, wherein the protective film has a thickness of 40 μm or less, and is formed by applying and energy ray-curable composition to the polarizer and irradiating the applied energy ray-curable composition with ultraviolet rays to polymerize and cure the energy ray-curable composition, wherein,
the energy ray-curable composition that comprises at least one of (a) an energy ray-polymerizing compound having a neopentylglycol group, and (b) an energy ray-polymerizing compound having a pentaerythritol group,
the energy ray polymerizing compound having a neopentylglycol group is selected from the group consisting of:

(c)

(d)

(e)

the energy ray polymerizing compound having a pentaerithritol group is one of the following chemical formulae:

(h)

(i)

in which R represents a hydrogen atom or a methyl group,
the polyvinyl alcohol is dyed only with iodine, and the energy ray-curable composition comprises an energy ray-polymerizing compound having a trimethylolpropane group in an amount of a least 60% by weight in terms of the resin solid content thereof.

9. The polarizing plate according to claim 8, wherein the energy ray-curable composition further comprises and energy ray-polymerizing compound having a bisphenol residue.

10. The polarizing plate according to claim 9, wherein the energy ray-curable composition comprises the energy ray-polymerizing compound having a bisphenol residue in an amount of at least 20% by weight in terms of the resin solid content thereof.

11. The polarizing plate according to claim 9, wherein the energy ray-polymerizing compound having a bisphenol residue has a bisphenol A-type group.

12. The polarizing plate according to claim 9, wherein the energy ray-polymerizing compound having a bisphenol group has a bisphenol F-type group.

13. The polarizing plate according to claim 8, wherein the energy ray-curable composition further comprises and energy ray-polymerizing compound that comprises a polyester (meth) acrylate.

14. A liquid-crystal display device having a liquid crystal panel, and the polarizing plate of claim 8, provided on at least one surface of the liquid-crystal panel.

15. A polarizing plate having a polarizer obtained from iodine-coloring a polyvinyl alcohol resin film, and a protective film directly formed on both surfaces of the polarizer, wherein the protective film has a thickness of 40 μm or less, and is formed by applying an energy ray-curable composition to the polarizer and irradiating the applied energy ray-curable composition with ultraviolet rays to polymerize and cure the energy ray-curable composition, wherein
the energy ray-curable composition consists of any energy ray-polymerizing compound having a pentaerythritol group selected from the group consisting of:

(h)

(i)

in which R represents a hydrogen atom or a methyl group, and
the polyvinyl alcohol is dyed only with iodine.

* * * * *